Oct. 29, 1935.  O. SCHRICKEL  2,019,098

MEANS FOR COMPOSING PICTURES

Filed Sept. 25, 1933  3 Sheets-Sheet 1

Inventor
Otto Schrickel
By Murray and Zugelter,
Attorneys

Oct. 29, 1935.  O. SCHRICKEL  2,019,098
MEANS FOR COMPOSING PICTURES
Filed Sept. 25, 1933  3 Sheets-Sheet 2

Inventor
Otto Schrickel
By Murray and Zugelter,
Attorneys.

Oct. 29, 1935.  O. SCHRICKEL  2,019,098
MEANS FOR COMPOSING PICTURES
Filed Sept. 25, 1933   3 Sheets-Sheet 3
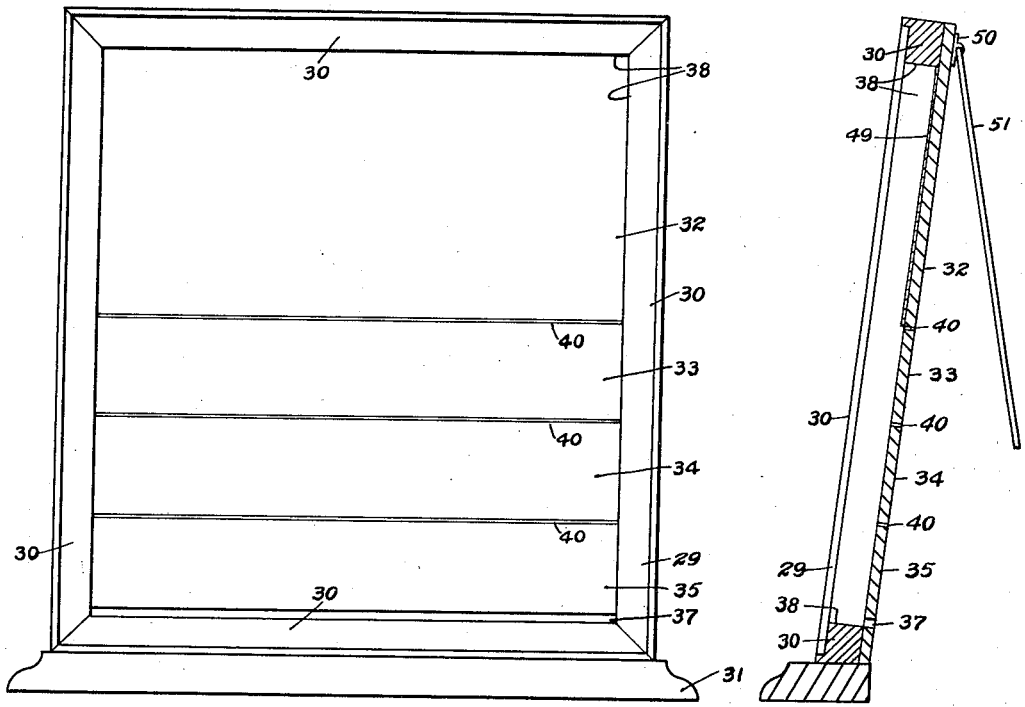
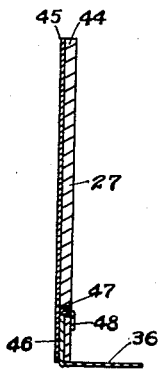
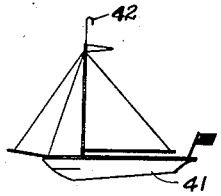
Fig. 9.  Fig. 10.

Inventor
Otto Schrickel
By Murray & Zugelter
Attorneys

Patented Oct. 29, 1935

2,019,098

UNITED STATES PATENT OFFICE 2,019,098

MEANS FOR COMPOSING PICTURES

Otto Schrickel, Mount Healthy, Ohio

Application September 25, 1933, Serial No. 690,850

8 Claims. (Cl. 41—34)

This invention relates to a means for composing or constructing complete pictures, using a plurality of independent constituent cut-outs or parts.

One object of the invention is to provide a novel means for constructing an infinite number of different pictures using a limited number of constituent parts.

Another object of the invention is to provide simple and inexpensive means for accomplishing the above object.

Another object is to provide an educational device which furnishes unlimited pleasure for adults and children alike.

A further object is to provide means whereby attractive picture effects are produced by the overlapping of cut-outs used in composing the pictures.

The foregoing and other objects are attained by the means described herein and disclosed in the accompanying drawings, in which:

Fig. 1 is a front elevational view of the device of my invention, with a picture constructed therein.

Figs. 2 to 8 inclusive are elevational views of the constituents or cut-outs that were used in constructing the picture of Fig. 1.

Fig. 9 is a front elevational view, on a reduced scale, of a supporting frame or board upon which the pictures are built or composed.

Fig. 10 is a vertical cross-sectional view of the frame or board of Fig. 9.

Fig. 12 is an elevational view of one form of auxiliary cut-out or constituent that may be incorporated into the picture, if desired.

Figure 1:
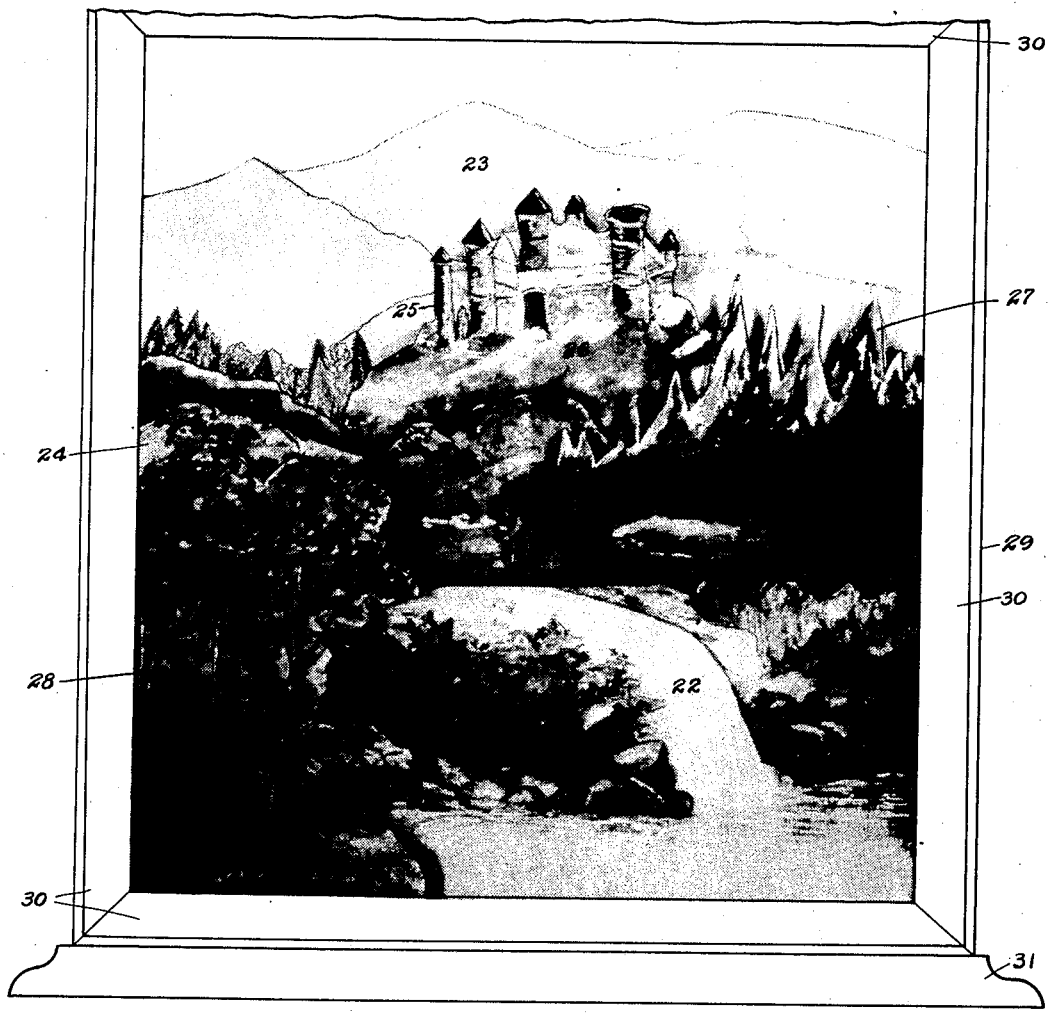
Figure 2:
Figure 3:
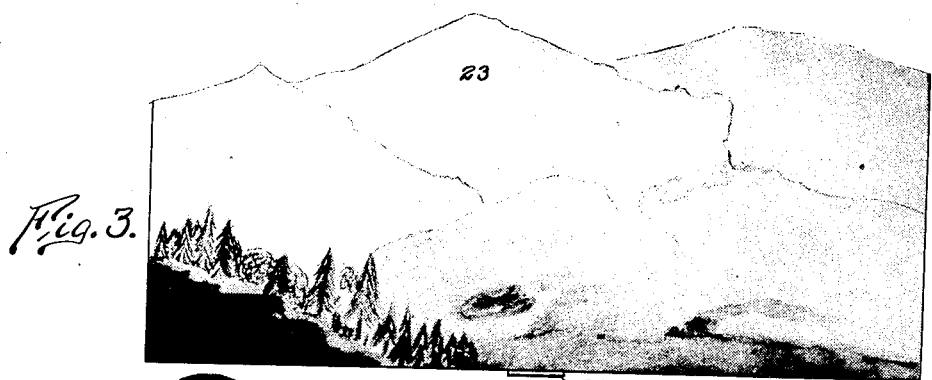
Figure 4:
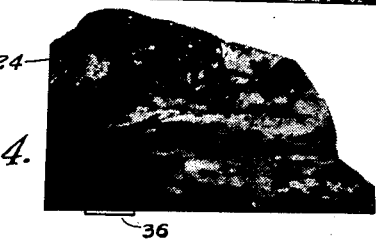
Figure 5:
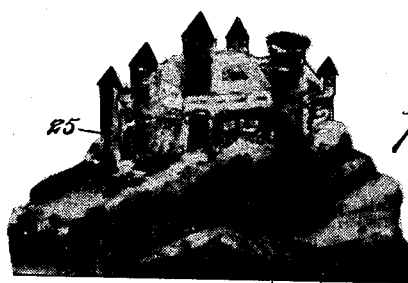
Figure 6:
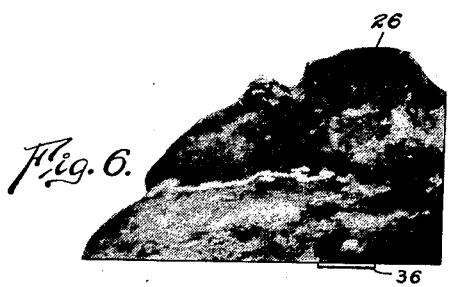
Figure 7:
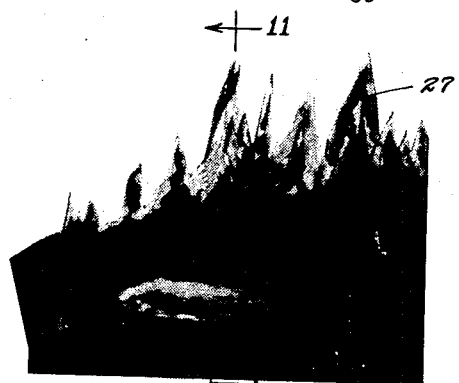
Figure 8:

In Fig. 1 of the accompanying drawings is shown one of a number of different pictures that may be composed by shifting and re-positioning the seven constituents or cut-outs indicated by Figs. 2 to 8, inclusive. The cut-outs are numbered 22 to 28, inclusive, on Fig. 1, for the purpose of indicating their relative positions on the particular representation of Fig. 1. It is to be noted that the cut-outs are not merely placed upon a background view, but they themselves are caused to provide the background as well as the foreground, by reason of the fact that the cut-outs overlap partially, but not wholly.

It is to be understood that a set of cut-outs would preferably consist of from ten to thirty or more pieces, many of which would be common to mountain scenes, water scenes, and scenes of forests, farms, deserts, villages, et cetera. For example, the cut-out 27 might be used in mountain scenes, scenes of farms, villages, lakes, gardens, et cetera. This is true also of cut-outs 22, 24, and 26, which represent rocks and a waterfall. The designs of cut-outs that may be employed are unlimited in number and character, and many can be used in various environments, as above explained, to give different effects to different picture compositions.

It is of course prohibitive to attempt a showing of the many different types of cut-outs that might constitute a set, but the understanding to be conveyed is that suitable cut-outs for various scenes are to be embodied in a set, and a set of 15 to 25 cut-outs will be found to provide material for the composition of an unlimited number of different pictures.

Figure 11:
Fig. 11 is a cross-sectional view of a constituent or cut-out, taken on line 11—11 of Fig. 7.

Means are provided for mounting the several cut-outs relative to a frame or easel member 29 which preferably is constituted of a series of border frame members 30 and a base 31, and provided with means to hold the cut-outs in selected relative positions. The holding means may be of any suitable character, but for purposes of explanation there is disclosed herein one form which has been found satisfactory. As illustrated in Figs. 9 and 10, the back of the frame member has glued, tacked, or otherwise secured thereto the series of spaced parallel slabs or sheets 32, 33, 34 and 35, of comparatively thick board material, and these are spaced apart sufficiently to receive the tongues or projections 36 of the cut-outs, (Fig. 11). Each cut-out has a tongue or substantially flat projection such as 36, whereby each may be supported relative to the frame member by inserting said tongue horizontally into the spaces between the equally spaced members 32, 33, 34 and 35. The space 37 between the lowermost slab or sheet 35 and the base portion, (Fig. 10), preferably is made sufficiently wide to receive a greater number of tongues or projections 36 than are received by the upper spaces, so that a very elaborate foreground may be built, if desired.

The inner faces 38 of the frame members are made deep, so as to provide lateral support for the cut-outs when they are placed in position against the rear supporting members 32, 33, 34 and 35. The uppermost member 32 preferably carries a representation of sky and clouds, which is printed or painted upon a sheet 49 that is mounted upon member 32.

In composing a picture, one or more full length pieces such as 22 are first applied by inserting the tongue thereof in one or more of the uppermost tongue-receiving spaces 40, after which the smaller cut-outs are superposed by inserting their tongues into either the same space or a lower one. It is important to note that all subsequently applied cut-outs partially, but not wholly, overlap those previously applied, so that there results, in effect, a shallow form of three-dimensional picture which enhances the attractiveness of the device. The tongues of the cut-outs are made sufficiently long to insure their holding function even though several or many cut-outs be placed upon one another; and in order that the various tongues may not so readily conflict with each other when applied to the frame, some of the tongues are secured to their cut-outs at different distances from the ends of the cut-outs (see Figs. 4 and 6).

After the desired picture has been composed, one or more auxiliary cut-outs such as 41 (Fig. 2), may be applied by means of a hook or the like 42 carried thereby; or if desired the auxiliary cut-out may be applied by merely placing it to rest upon the top edge of any one of the other cut-outs. Auxiliary cut-outs may be in the form of boats of various types, aircraft, animals, vehicles, and other objects that would necessarily appear small on a scene or picture.

The manner of securing the tongues or holders onto the cut-outs is immaterial to the invention, however, Fig. 11 discloses one satisfactory construction wherein 44 and 45 represent, respectively, a stiffening sheet and a printed or painted sheet glued or otherwise secured together. Between the sheets, at the lower edges thereof, extends the vertical leg 46 of the tongue member, and the free end of said leg is extended through a slit 47 in sheet 44, where it is bent upon itself as at 48 to clamp onto the sheet 44. Other modes of securing the tongue pieces may be employed, as stated above.

It is to be understood that any desired number of tongue receiving slots may be associated with the easel or frame, and that the distances between slots may be varied. Also, it is not necessary that each of the slots be as long as the frame width, although such construction is preferable. It will readily be understood that a series of short slots in the board would serve to hold the tongues of the cut-outs.

The various cut-outs preferably have their printed or painted representations tinted with colors that do not noticeably clash when the cut-outs are arranged in different relative positions. A great many of the same cut-outs thereby may be used in many different pictorial representations, wherefore an unlimited number of different scenes may be composed using relatively few cut-outs. The character 50 indicates a suitable means for the attachment of a supporting strut or brace member 51 adapted to preclude backward tilting of the frame or easel 29.

The device of this invention may easily be packed in a comparatively flat box or case, and its cost is small. Besides being educational in nature, it is a source of endless pleasure to be enjoyed by adults as well as children during leisure moments.

It is to be understood that various modifications and changes in the structural details of the device may be made, within the scope of the appended claims, without departing from the spirit of the invention.

What I claim is:

1. Means for composing a great number of pictures with the use of relatively few constituents, comprising a supporting board having a series of long narrow slots permanently located therein and disposed substantially in spaced parallelism, a series of individual picture parts and supports therefore constituted of substantially flat extending tongues to be inserted into any of the slots, and slid therealong to desired positions upon the board, whereby to partially overlap any given picture part with one or more other picture parts on the board, the tongues being of a length exceeding the thickness of the board to provide for displacement of the tongues by application of force thereto at the rear of the board.

2. Means for composing a great number of pictures with the use of relatively few constituents, comprising a supporting board having a series of long narrow slots permanently located therein and disposed substantially in spaced parallelism, a series of individual picture parts and supports therefor constituted of substantially flat extending tongues to be inserted into any of the slots, and slid therealong freely to desired positions upon the board, whereby to partially overlap any given picture part with one or more other picture parts on the board, and auxiliary small picture parts having substantially level lower edges and extending hooks, whereby said auxiliary parts may be either placed to rest upon the upper edges of the board-supported parts, or suspended from said upper edges by means of the hooks.

3. A supporting easel for composite pictures, comprising a supporting board having a series of long narrow slots permanently located therein for the reception of picture-part holders to be slid freely along the slots, and a base part for the easel having an adjacent slot of a width approximating three times the width of the previously mentioned slots.

4. A supporting easel for composite pictures, comprising a series of stationary rigidly mounted parallel board members spaced slightly to provide spaced parallel slots for the reception of picture-part holders, a base part for the easel spaced from one of the board members a distance approximating three times the distance between adjacent board members, and a frame surrounding the board members and extended forwardly thereof to provide a cavity.

5. In a device of the class described the combination of a supporting easel for composite pictures, comprising a board-like back having narrow slots extending across the back in spaced substantially parallel relationship, the slots extending entirely through the back, and picture-part holding tongues longer than the thickness of the back to provide for removal of the tongues by application of force at the rear of the board-like back.

6. In a device of the class described the combination of a supporting easel for composite pictures, comprising a board-like member constituted of fixed spaced elements providing narrow slots extending through and across the board-like member in spaced substantially parallel relationship, the board-like member being sufficiently thick at the slots to provide lateral support for tongue members fitted into the slots when the easel is inclined, and picture parts supported by the tongue members in overlapping relationship.

7. Means for composing a great number of pictures with the use of relatively few parts, comprising a supporting frame including a board-like back member having a series of slots of definite width and spacing extending transversely of and through the back member, a series of individual irregularly shaped picture cut-outs designed to conform with each other in unlike types of scenes, and holding means for the cut-outs, engageable and freely slidable in the slots, to compel partial overlapping of the cut-outs to produce a shallow three-dimensional picture.

8. Means for composing a great number of pictures with the use of relatively few parts, comprising a supporting frame including a board-like back member having a series of slots of fixed widths extending transversely of and through the back member, a series of individual irregularly shaped picture cut-outs designed to conform with each other in unlike types of scenes, and holding means for the cut-outs, engageable in the slots, to compel partial overlapping of the cut-outs to produce a shallow three-dimensional picture, said holding means being sufficiently extensive to project through and past the slots of the back member to enable removal of the holding means by application of force at the rear of the frame.

OTTO SCHRICKEL.